| United States Patent [19] | [11] 3,943,255 |
| Newkirk | [45] Mar. 9, 1976 |

[54] ALKYL POLYMAINE MICROBIOCIDES

[75] Inventor: John D. Newkirk, Downers Grove, Ill.

[73] Assignee: Nalco Chemical Company, Oak Brook, Ill.

[22] Filed: May 22, 1974

[21] Appl. No.: 472,261

[52] U.S. Cl. .................. 424/329; 71/67; 162/161; 210/64
[51] Int. Cl.² .................. A01N 9/20; A01N 9/24
[58] Field of Search .............. 424/329; 260/567.6 P; 162/161; 210/64

[56] References Cited
UNITED STATES PATENTS

| 3,069,320 | 12/1962 | Vitalis | 424/32 A X |
| 3,304,349 | 2/1967 | Shen | 260/567.6 P X |
| 3,342,829 | 9/1967 | Schorr | 260/567.6 P X |
| 3,493,615 | 2/1970 | Bauman | 424/32 A X |
| 3,567,729 | 3/1971 | Lewis et al. | 424/32 A X |

*Primary Examiner*—Stanley J. Friedman
*Assistant Examiner*—Allen J. Robinson
*Attorney, Agent, or Firm*—John G. Premo; John S. Roberts

[57] ABSTRACT

Active microbiocides prepared by reacting a long-chain N alkyl diamine such as cocodiamine in molar amounts with 0.5–3.0 moles of epichlorohydrin under controlled conditions and then terminating the active end groups by reacting with 0.5–3.0 moles of a tri lower alkylamine, such as trimethylamine. The poly quaternary nitrogen compounds produced are effective at 25 ppm levels in recirculating systems against bacteria, such as A. aerogenes. In inhibition tests these compounds have also proved effective against fungi, such as A. niger.

8 Claims, 2 Drawing Figures

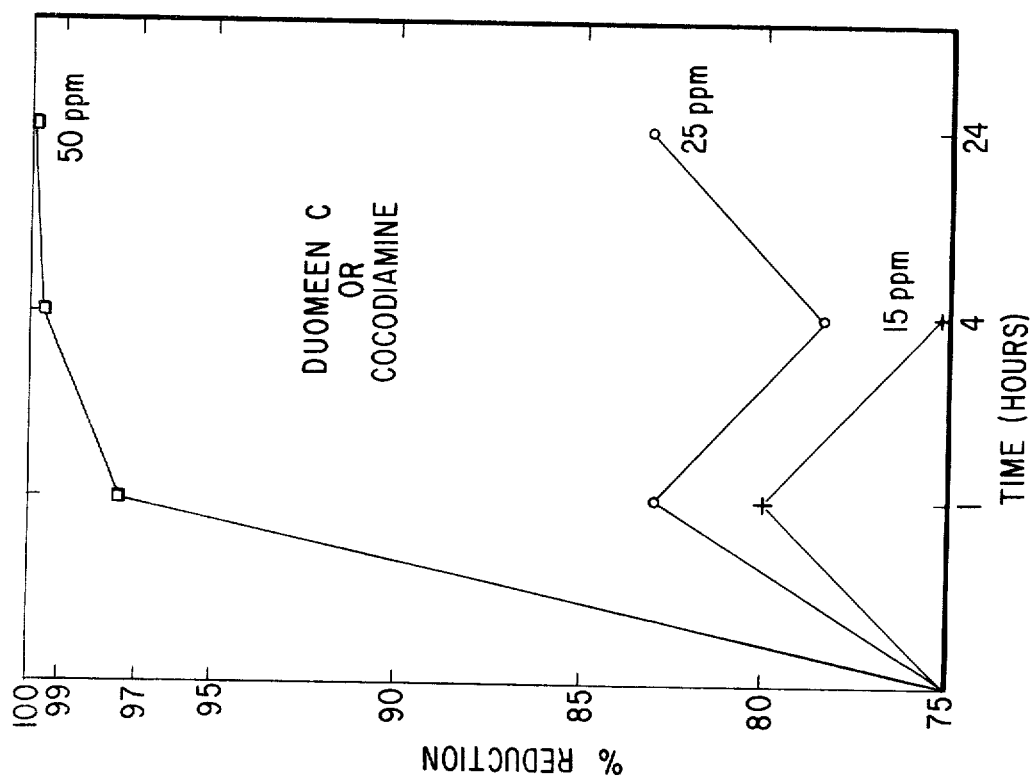
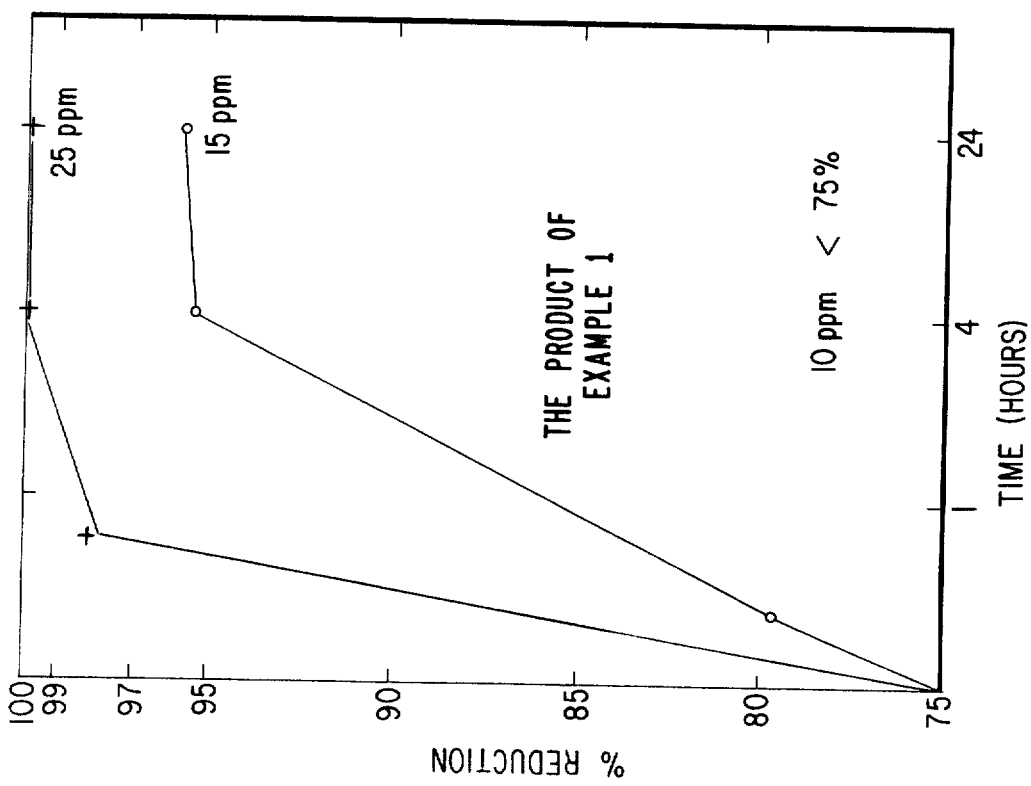

ALKYL POLYMAINE MICROBIOCIDES

The present invention relates to a method of treatment of aqueous systems and certain novel microbiocide products which are derived from N-alkyl trimethylene diamines wherein the alkyl group has a carbon length in the range $C_6$–$C_{18}$, and preferably the alkyl group is in the range $C_{12}$–$C_{16}$ and saturated. The preferred basic starting materials are known compounds, as for example the DUOMEENS (Armour Company). The DUOMEEN compounds are listed in the *Condensed Chemical Dictionary* (CCD 8), Van Mostrand-Reinhold, 1971, page 336, and defined as mixtures derived from coco, soya, or tallow fatty acids. DUOMEEN-C is the specific DUOMEEN derived from coco fatty acid and is commonly known as cocodiamine.

Additional operable diamines as taken from the *Encyclopedia of Chemical Technology* II, Vol. 2, Wiley, 1963, page 135, are set out below.

| Chemical Identity | Trade Name | Manufacturer | Form |
|---|---|---|---|
| N-octadecenyltri-methylenediamine | Formonyte 808 | Foremost Food & Chem. Co. | |
| | Duomeen O | Armour Ind. Chem. | Liquid |
| N-coco trimethylene-diamine | Diam 21D | Gen. Mills | Liquid |
| | Duomeen C | Armour | |
| | Formonyte D801 | Foremost | |
| N-tallow trimethylene-diamine | Diam 26 | Gen. Mills | |
| | Duomeen T | Armour | Solid |
| | Formonyte 802 | Foremost | |
| N-(octadecenyl-octadecadienyl)tri-methylenediamine | Duomeen S | Armour | Solid |

These known diamines have been found to be useful for microbial effect in water treatment compositions such as those designed for once-through and recirculating cooling towers, and other compositions where a microbicidal agent is required, such as corrosion inhibitors, dispersants, flocculating agents, etc. However, in commercial use, it has been found that certain derivatives, particularly quaternary derivatives, of these N-alkyl trimethylene diamines have proved active and operable in specialized situations where greater hydrophylicity is desired.

STARTING MATERIALS

As noted above, the starting materials are N-alkyl trimethylene diamines of the following formula:

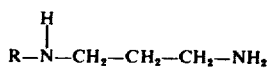

where $R = C_6$–$C_{18}$

The basic amines are long-chain amines with a broad range of carbon length of $C_6$–$C_{18}$, and preferred starting materials may be mixtures derived from coco, soya, and tallow, such as cocodiamine (DUOMEEN-C — Armour). Whereas it is contemplated that the carbon chain may be saturated or unsaturated, the preferred members are saturated.

REACTION WITH EPICHLOROHYDRIN AND END CAPPING WITH TRIALKYLAMINE

The basic starting amine as noted above is reacted under controlled conditions with an epihalohydrin group, preferably epichlorohydrin. This reaction results in the introduction of a 3-chloro, 2-propanol group into the basic diamine. Subsequently the reaction is stopped by terminating the reactivity of the active end groups ($Cl^-$) by reacting with a trialkylamine according to the schedule of equations noted below:

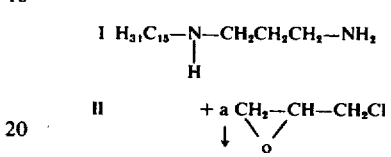

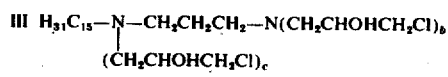

Where
$a = b + c$
$a = 0.5, 1.0, 1.5, 2.0, 2.5, 3.0$

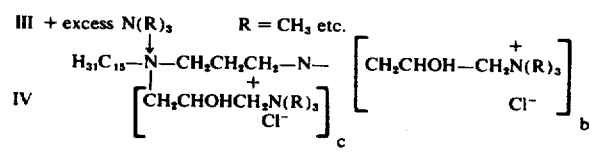

In the above (I, II, III), a typical trimethylene diamine, as here cocodiamine, is reacted with epichlorohydrin where the total molar amount of the epichlorohydrin disposed between reacting with the primary amine and the secondary amine is 0.5, 1.0, 1.5, 2.0, 2.5, and 3.0. This reaction is carried out with analysis such that about 91% of the available chloride ion is left for subsequent reaction with TMA. A preferred medium for the reaction is aqueous and reaction is carried out at slightly elevated temperatures of about 30°C in an autoclave under slight super-atmospheric pressure. Alternatively, the reaction may be carried out in an alcoholic medium such as a mixture of lower alkanol and water or alkanol alone and a preferred lower alkanol is isopropanol.

The reactions III and IV above illustrate the capping of the reaction with a trialkylamine such as trimethylamine which ties up the end groups (i.e., the available chloride end groups) and enables the formation of the desired quaternary product. Analysis is made at regular intervals for chloride by silver nitrate titration, and this also monitors the reaction during the epichlorohydrin reaction step. Effort is made to retain a chloride activity of at least 90% Cl⁻ for the trialkylamine reaction step to avoid competing reactions. In the complete reaction, the epichlorohydrin acts as a bridge between the cocodiamine and the trialkylamine. In the trialkylamine reaction a molar surfeit of 10–15% of trialkylamine is utilized to assure adequate quaternization and the molar amount of trialkylamine utilized is the same as the amount of epichlorohydrin utilized. In practice, any low molecular weight trialkylamine is a possibility for quaternization and those with the short alkyl chains are preferred. A reagent of choice for utilization is trimethylamine (TMA).

BIOCIDAL ACTIVITY

These alkyl polyamine quaternary microbiocides which have been quaternized with trialkylamines show microbicidal activity against bacteria such as A. aerogenes at a level of 25 ppm in recirculating systems. Additionally, in inhibition tests these compounds showed activity against other microorganisms such as fungi illustrated by A. niger. Especially preferred are those compounds prepared from DUOMEEN C (cocodiamine) which have been reacted with epichlorohydrin and subsequently the chloride end groups have been deactivated or terminated by reaction with trimethylamine.

DOSAGE

The present microbicidal compositions may be used effectively against fungi and bacteria of common species contaminating aqueous systems in amounts ranging upwardly from about 25 ppm. In commercial practice the dosage in such systems ranges from about 25–100 ppm. Among said organisms against which these microbiocides have been found active are A. aerogenes and A. niger.

FIG. 1 illustrates the two plots of percentage reduction of microorganisms against the treating agent shown as the product in Example 1 in ppm over a time zone 1–24 hours.

FIG. 2 shows a similar plot for DUOMEEN C or cocodiamine. A comparison of FIG. 1 versus FIG. 2 shows improved results with the present treating agent.

EXAMPLE I

Reaction of Cocodiamine with Epichlorohydrin and Subsequent Utilization

435 G (1.5 moles) of DUOMEEN C (cocodiamine) was reacted with 278 g (3.0 moles) of epichlorohydrin in water solution in an autoclave fitted with a stirrer at about room temperature or from about 10°–30°C for 2–4 hours. At the end of this time the chloride activity tested 18.2% Cl⁻, indicating that approximately 91% chloride was bound in the desired product.

200 G (3.0 moles) of TMA were added and an additional amount amounting to about 10–15% excess was added to force the reaction to the right. In this second reaction the temperature was maintained between 13°–53°C during an 8-hour period and at the end of the reaction the temperature was maintained between 40°–53°C for 3 hours with concomitant slight atmospheric over pressure of 5–8 psi. The product was a viscous turbid liquid which was analyzed for chloride and stripped under vacuum for utilization in microbiological testing. The product was completely water soluble and was found to have a microbial activity greater than the original cocodiamine.

Chloride analysis after Step 1 (I–III) utilizing silver nitrate indicated a specific chloride ion content of 18.2% of theory for Cl⁻ indicating at least 91% left for reaction with TMA.

After the TMA reaction a stripped sample of the product indicated by this method 3.50 mg/gm of Cl⁻ are close to the theory of 3.37, indicating completion.

Additional experiments were made with isopropanol and isopropanol-water mixtures, but the aqueous system showed some advantage in activity.

EXAMPLE II

A simulated cooling tower for evaluating the activity of compounds against microorganisms was utilized in accordance with the standardized technique published under Nalco Reprint 138, 1964, and which was presented at the North Central Regional meeting, N.A.C.E., September 1964, Chicago, Illinois. This paper was entitled "A Path to Effective Microbial Control" by Leonard L. Wolfson and Peter Song. The test apparatus is described as follows and has been used for bacteria evaluations. The bacteria test was against Aerobacter aerogenes.

RECIRCULATOR DESCRIPTION

A recirculating apparatus was used which consisted of a five-gallon, width-mouth jar in which a ⅝ inch hole was drilled near the base. The water was recirculated by means of an Eastern Model D-11 electric motor and pump assembly. A plastic ladder was made of ¼ inch and ⅜ inch plexiglass, with over-all dimensions of 13 × 4 inches. It was designed so that a wooden slat was held at the top of the plastic ladder. Slots ¾ inch deep were cut in the ladder so that wooden slats could be inserted at an angle of 30° from the horizontal. The wooden slats were cut from white pine lumber to a size of ¼ × 1¼ × 3 ⅝ inches. Alternate baffles had a piece of wood ¾ × ⅜ inch removed on each side so that each alternate slat would lie directly under the slat above, such as is found in the fill section of a cooling tower. The slat for the top deck is ¼ inch shorter in length in order to fit on top of the ladder. The top deck slat had 21 holes drilled in it, ⅛ inch in diameter, and at a distance of 5/16 inch from each other.

TEST PROCEDURE

At the start of a test, 10 liters of Chicago tap water were put in the jar. The nutrient added in the bacterial recirculators consisted of inorganic chemicals supplemented with dextrose to encourage rapid growth of the organisms. The water and media were allowed to recirculate until the temperature of the water reached 90°–95°F. As the water recirculated, it struck the top deck and then ran down through the holes in the top deck and over the slats just as it would in a typical cooling tower. Aeration occurred at this time, and the water then returned to the reservoir or basin from where it was recirculated again to the top deck.

For the bacterial recirculators, cultures of Aerobacter, common slime-forming organisms, were inoculated into the system. These organisms were isolated from industrial cooling towers. The algae recirculators were inoculated with a culture of Oscillatoria, blue-green algae which had also been isolated from a cooling tower system. After inoculation with the organisms the pH was adjusted to 8.0.

The recirculators were then allowed to run for 96 hours during which time a heavy slime developed on the top deck of the bacterial recirculators. This slime plugged the holes of the top deck in 48 to 72 hours. In the case of the algae the recirculators were allowed to run for one week under two 100-watt fluorescent lamps which provided 500–1000 foot candles of light. After 1 week of algae build-up, the water containing nutrients was removed and Chicago tap water was used with no added nutrients.

A chemical which was to be evaluated as a slimicide was put into the bacterial recirculators at zero hour, and the slimicide activity was determined by its ability to prevent slime deposition on the wooden slats. Bacterial counts were taken at zero hour and at convenient intervals throughout the test to correlate slime build-up and removal with bacterial numbers. In the case of the algae, the only difference was that the chemical was added after the algae had grown for one week. To prove performance, the algicide must then kill and remove the algae from the wooden slats.

When tested at a level of 25 ppm against the microorganisms, including bacteria, a product of Example I showed almost complete protection in percent reduction of bacteria according to FIG. 1.

I claim:

1. A bactericidal or fungicidal composition comprising an aqueous carrier and a bactericidally or fungicidally effective amount of at least 25 ppm of a mixture of 1 mole of N-alkyl triethylene diamine where alkyl is $C_6-C_{18}$ with 0.5–3.0 moles of epihalohydrin and subsequently quaternized with an excess of tri lower alkylamine.

2. The composition of claim 1 wherein the epihalohydrin is epichlorohydrin and alkyl is $C_{12}-C_{16}$.

3. The composition of claim 1 wherein the triethylene diamine is cocodiamine.

4. The composition of claim 1 wherein the trialkylamine is trimethylamine.

5. A method of combatting bacteria or fungi in aqueous systems comprising applying to said bacteria or fungi a bactericidally or fungicidally effective amount of at least 25 ppm of a mixture of 1 mole of N-alkyl triethylene diamine where alkyl is $C_6-C_{18}$ with 0.5–3.0 moles of epihalohydrin and subsequently quaternized with an excess of a tri lower alkylamine.

6. The method of claim 5 wherein the epihalohydrin is epichlorohydrin and alkyl is $C_{12}-C_{16}$.

7. The method of claim 5 wherein the triethylene diamine is cocodiamine.

8. The method of claim 5 wherein the trialkylamine is trimethylamine.

* * * * *